US006619941B1

United States Patent
Smith et al.

(10) Patent No.: US 6,619,941 B1
(45) Date of Patent: Sep. 16, 2003

(54) CAST FILM COOLING DEVICE

(75) Inventors: David J. Smith, Topsfield, MA (US); Kenneth D. Warnock, Jr., Essex, MA (US)

(73) Assignee: Battenfeld Gloucester Engineering Co., Inc., Gloucester, MA (US)

( * ) Notice: Subject to any disclaimer, the term of this patent is extended or adjusted under 35 U.S.C. 154(b) by 0 days.

(21) Appl. No.: 09/560,491

(22) Filed: Apr. 28, 2000

(51) Int. Cl.⁷ .............................. B29C 47/88
(52) U.S. Cl. ................... 425/72.1; 425/224; 425/377
(58) Field of Search ................ 425/72.1, 224, 425/377, 378.1, 379.1; 264/211.13

(56) References Cited

U.S. PATENT DOCUMENTS

| | | | | |
|---|---|---|---|---|
| 2,688,155 A | * | 9/1954 | Nadeau et al. | 425/224 |
| 3,102,302 A | * | 9/1963 | Moore | 425/466 |
| 3,141,194 A | * | 7/1964 | Jester | 264/216 |
| 3,223,757 A | * | 12/1965 | Owens et al. | 264/216 |
| 3,423,493 A | * | 1/1969 | Klenk et al. | 425/377 |
| 3,904,725 A | * | 9/1975 | Husky et al. | 264/216 |
| 4,255,365 A | * | 3/1981 | Heyer | 264/211.13 |
| 4,310,295 A | * | 1/1982 | Heyer | 425/224 |
| 4,676,851 A | * | 6/1987 | Scheibner et al. | 156/244.11 |
| 4,874,571 A | * | 10/1989 | Muller | 264/211.13 |
| 5,091,134 A | * | 2/1992 | Oshima et al. | 425/224 |

\* cited by examiner

Primary Examiner—James P. Mackey
Assistant Examiner—Joseph Leyson
(74) Attorney, Agent, or Firm—D. J. Shade

(57) ABSTRACT

An improved air cooling device for the production of cast film is shown. The device is intended to increase production rates for film without reducing the level of film gauge control. The devices utilizes a soft box for the bulk of the cooling and a directional source of pressurized air to deflect exhaust air from the soft box from striking the web curtain between the die and chill roll.

4 Claims, 4 Drawing Sheets

CAST FILM COOLING DEVICE

BACKGROUND OF THE INVENTION

1. Field of the Invention

The current invention concerns an enhanced fluid operated pinning and cooling assist device and method used for the production of thermoplastic film by the cast film process.

2. Prior Art

It has long been recognized that better contact between the molten web and the chilled casting roll used to produce thermoplastic film by the cast film process results in better web cooling rates, improved production rates, improved properties dependant upon a fast cooling rate, and improved uniformity of gauge of the resulting film. To promote better contact between the molten web and chilled cooling roll numerous devices have been tried, all successful to a greater or lesser degree, to pin the melt curtain to the casting roll and/or eliminate or minimize the layer of air trapped between the melt curtain and the casting roll.

Initially, some forms of electrostatic pinning devices were used to secure the web to the chill roll. In U.S. Pat. No. 3,102,302 a full width electrode for pinning the web to the chill roll is disclosed and claimed, while on the other hand U.S. Pat. No. 3,223,757 discloses and claims an electrostatic devices for pinning the edges of the web to the chill roll. Eventually, however, increasing web speeds revealed shortcomings to the electrostatic pinning devices; as web speeds increased the tendency to entrain air between the web and the chill roll also increased.

To overcome this high-speed air entrainment problem other types of devices were introduced. Typically, these devices move air either at or away from the roll and melt curtain. One of the first such devices was an air knife as shown in U.S. Pat. No. 4,874,571. This device delivers a linear stream of air against the melt curtain at or near the location at which the melt curtain strikes the chilled casting roll, thereby forcing entrapped air from between the melt curtain and the casting roll surface. Additionally, vacuum boxes designed to pull air away from the melt curtain/roll surface interface, i.e. from under the web, as shown in U.S. Pat. No. 4,310,295 were also used. To further improve contact between the web curtain and the chill roll, another device, hereinafter referred to as a soft box, was eventually introduced. The soft box approached the problem of improving contact by directing a diffuse stream of pressurized air over the web curtain. Unlike a conventional air knife, however, which delivers the air stream essentially in a linear pattern, the stream from the soft box is more diffuse and is applied over a significant portion of the roll circumference. See U.S. Pat. No. 5,091,134 for one configuration of what is herein referred to as a soft box.

While the soft box has resulted in improvements in rate of film production and heat transfer related properties of the resulting film such as clarity, it has also inadvertently resulted in a reduction in film gauge uniformity. Specifically, the problem with reduced gauge uniformity appears to be related to flutter introduced into the web in the unsupported span between the die and the chill roll by air escaping from the soft box. It is therefore an object of the present invention to provide an enhanced cooling device for cast film production which will eliminate the problems associated with air discharge from conventional soft boxes. It is still another object of the present invention to provided an improved cooling device for cast film production which will result in higher production rates for cast film than heretofore seen while improving or at least maintaining acceptable gauge performance.

SUMMARY OF THE INVENTION

In accordance with the present invention, there is a new cooling apparatus for cast film comprising a first plenum for supplying a diffuse stream of air to the surface of a melt curtain on a casting roll and a second plenum for producing a directional source of pressurized air so located at to discharge pressurized air into the air discharge stream from the upper portion of the first plenum whereby the air discharge from the first plenum does not strike and induce flutter in the melt curtain between the die and the chill roll.

DESCRIPTION OF THE PREFERRED EMBODIMENT

Figure 1:
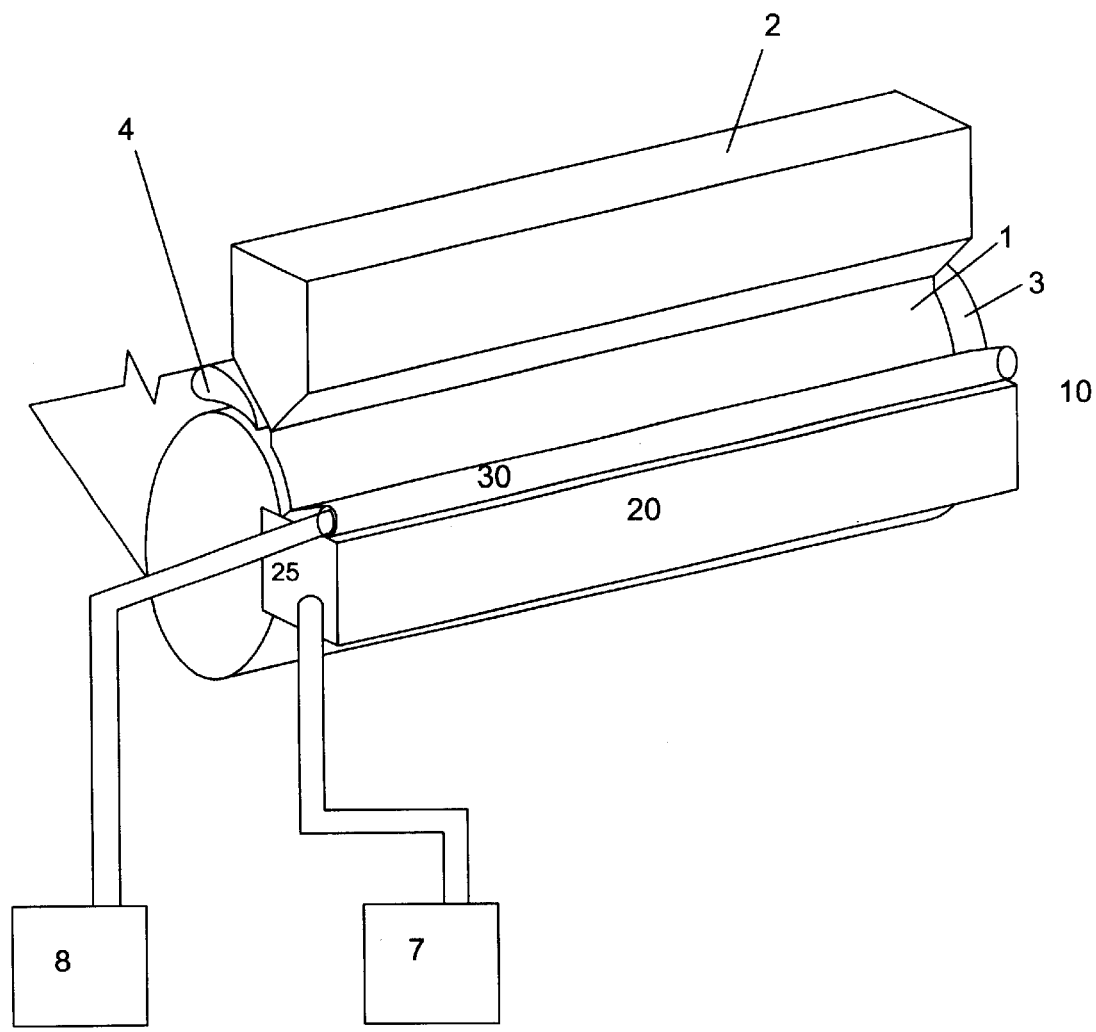
FIG. 1 shows a cast film die and stand incorporating the cooling device of the present invention.

As shown in FIG. 1, melt curtain 1 is extruded from slot die 2 onto casting roll 3. A vacuum box 4 of typical construction is located adjacent to but against the direction of rotation from the point at which melt curtain 1 strikes the surface of casting roll 3. Vacuum box 4 is used to evacuate air from between melt curtain 1 and surface of casting roll 2 to provide better heat transfer from melt curtain 1 to casting roll 3. Following melt curtain 1 in the direction of rotation of casting roll 3 from the location at which it strikes casting roll 3 is the cooling device 10 which is the subject of the present invention. As shown in this FIG. 1, there are two major assemblies, a first plenum assembly 20 and a second plenum assembly 30. Each plenum assembly 20 and 30 is provided with its own source of pressurized air, 7 and 8, which typically will be a centrifugal blower. Additionally, as shown in FIG. 1, plenum 20 partially overlies casting roll 3 and melt curtain 1, as side pieces 25 and 25' of first plenum assembly 20 project inwardly and parallel to the ends of casting roll 3. For purposes of future reference, a tangent to the surface of casting roll 3 at the point at which air discharged from second plenum assembly 30 strikes roll 3 is identified as 50.

Figure 2:
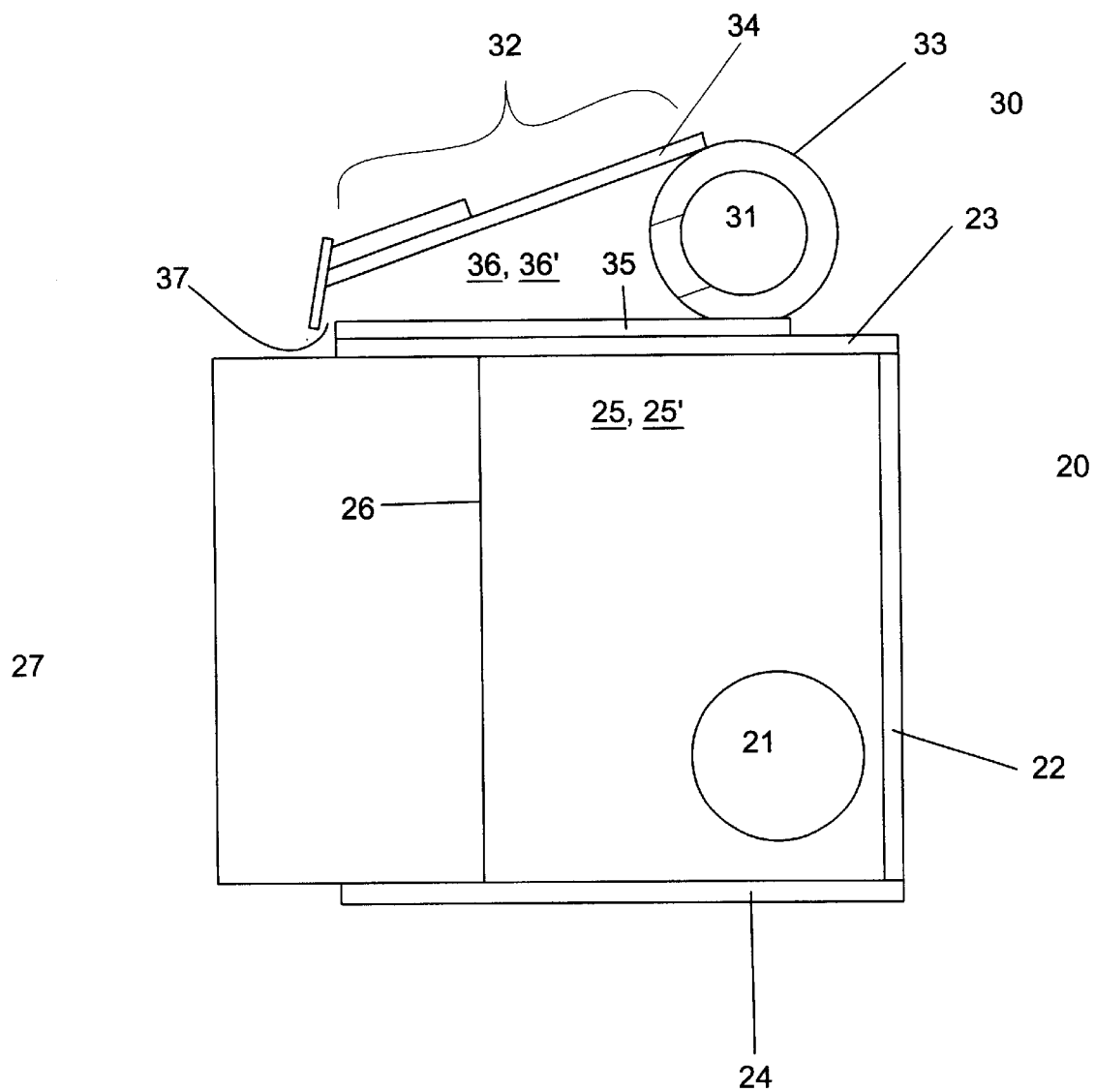
FIG. 2 shows a cutaway view of the cooling device according to the present invention.

The cooling device 10 of the present invention is shown in detail in FIG. 2. There is a first plenum assembly 20 having an air inlet 21, a back wall 22, a top piece 23, a bottom piece 24, two end pieces 25 and 25', and a discharge side 27. Additionally, there is a perforated diffuser 26 situated between back wall 22 and the discharge side 27. Discharge side 27 is open, and in operation will be adjacent to cooling roll 3 and web 1 which lies on cooling roll 3. The relationship between cooling roll 3, web 1 and discharge side 27 can be seen most clearly in FIGS. 1 and 4. Immediately above the first plenum assembly 20 is a second plenum assembly 30. Second plenum assembly 30 has an air inlet 31 and a body assembly 32 having a tubular back wall 33, a top piece 34, a bottom piece 35, two end pieces 36 and 36', and a linear discharge nozzle 37. In the preferred embodiment as shown in FIG. 2, tubular back wall 33 will also serve to distribute air to the inside of the plenum and will comprises a heavy walled pipe to which top piece 34 and bottom piece 35 are attached. Tubular back wall 33 has been perforated between the points of attachment of top piece 34 and bottom piece 35.

Figure 3:
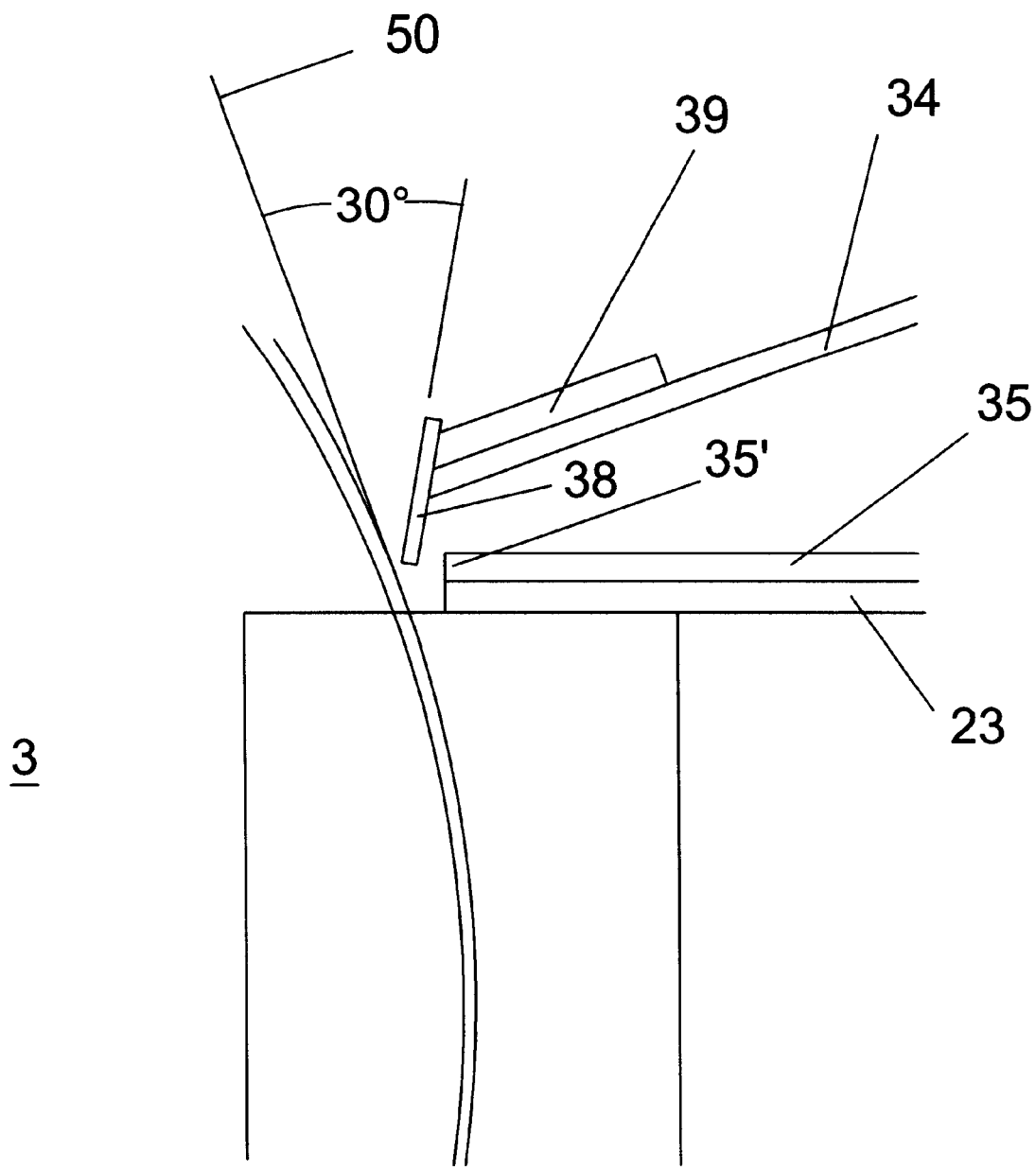
FIG. 3 shows a detailed view of the linear air discharge nozzle used in the present invention.

FIG. 3 shows the detailed structure of discharge nozzle 37, and its relationship to top piece 23 of first plenum assembly 20, casting roll 3, web 1, and the discharge path 29 for air from first plenum assembly 20. Second plenum assembly 30 is mounted directly onto the top piece 23 of first plenum assembly 20. Mounted on top piece 34 of second plenum assembly 30 is an adjustable blade 38. An air discharge nozzle 37 is defined between the inboard end 35' of bottom piece 35 and the adjustable blade 38. Adjustable blade 38 is mounted to top piece 34 by mounting block 39. Any conventional means may be used to mount blade 38 to top piece 34 that will allow some movement of adjustable blade 38 with respect to bottom piece 35. In practice it has been found that mounting block 39 to mounting top piece 34 with simple machine screws, wherein the screw holes in mounting block 39 are elongated is satisfactory.

FIG. 3 also shows the relationship between the discharge zones for the first plenum and the second plenum. As shown, the discharge from the linear nozzle 37 of the second plenum discharges directly into the upper discharge stream of the first plenum. This upper discharge stream for first plenum assembly 20 is defined by top piece 23, sidepieces 25 and 25', and the outer surface of casting roll 3 and melt 1. As shown in FIG. 3, the orientation of adjustable blade 38 is intended to strike tangent 50 on cooling roll 3 at an angle of approximately 30 degrees.

Figure 4:
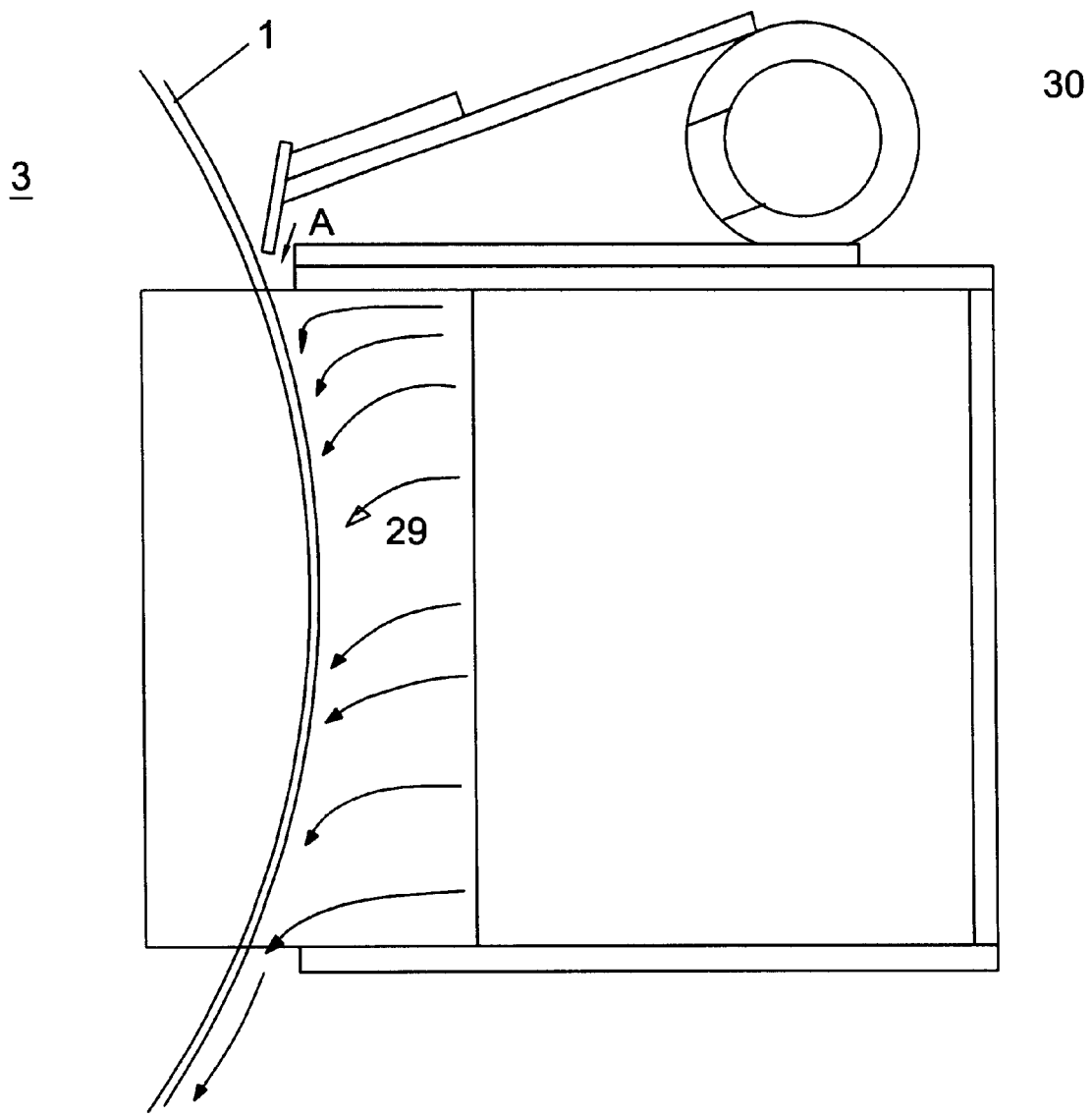
FIG. 4 shows a schematic view of the airflow from the cooling device over the casting roll and web.

FIG. 4 shows the directions of airflows associated with the present invention. Melt curtain 1 is initially struck by a linear discharge from nozzle 37 of second plenum assembly 30 and forced against casting roll 3. Melt curtain 1 is then further forced onto the surface of casting roll 3 by the diffuse air discharge from first plenum assembly 20. As shown in FIG. 4 and as previously discussed in conjunction with FIG. 3, air discharged from nozzle 37 is directed into the opening at the upper surface of first plenum assembly 20 formed by casting roll 3 and melt curtain 1, side pieces 25 and 25' and top piece 23. This air stream discharged from nozzle 37 deflects air discharged from the first plenum assembly 20 that would normally be expected to escape through this opening and redirects the flow along the direction of rotation of casting roll 3. The net effect of the air discharges from nozzle 37 and first plenum assembly 20 is to press melt curtain 1 tightly to casting roll 3 while substantially limiting the air discharge from first plenum assembly 20 from striking melt curtain 1 between die 2 and the location at which it strikes casting roll 3. As previously indicated, flutter or other motion of melt curtain 1 in the region between die 2 and casting roll 3 induced by air escape results in gauge variations in the finished film. It is customary for the air discharged from both the first and second plenums to be at ambient temperature; for certain applications, however, an improvement in rate may further be seen if the air discharged from the first plenum is cooled below ambient temperature.

By way of example, the current invention was tested on the production of multi-layer polypropylene film. The polypropylene film had a finished width of 4300 mm and a nominal thickness of 20 microns. The film was extruded at a rate of 1000 Kg per hour. Air pressures in the first and second plenums exceeded 0.5 inches of water, and preferably were in the range of 2 to 3 inches of water and 5 to 10 inches of water respectively. Film thickness measurements made on line with an NDC Beta gauging system showed a maximum film thickness variation across the web of 1.5%.

Although the invention has been illustrated by the production of polypropylene film, the invention is not to be construed as limited to the production of propylene film. All manner of thermoplastic film forming resins used in the cast film process can be processed with the current invention. The combined flows from both plenums not only reduces flutter between the extrusion orifice and the chill roll, thereby improving gauge control, but also improves rate by improved pinning of the web to the casting roll and reduced air entrainment.

We claim:

1. An cooling device for manufacturing thermoplastic film by the process in which a melt curtain is extruded from a slot die onto a rotating chilled casting roll comprising a first plenum located adjacent to and overlying said chilled casting roll and melt curtain for discharging a diffuse stream of cooling air onto a substantial portion of the surface of a thermoplastic web on said chilled casting roll and a second plenum for discharging a linear source of air parallel to the axis of said chilled casting roll, said second plenum located before said first plenum with respect to the direction of rotation of said casting roll and said discharge linear air directed towards said first plenum and said chilled casting roll, whereby the air discharged from said second plenum diverts the air escaping from said first plenum from striking said thermoplastic web after said web is discharged from said slot die but prior to the time at which said web strikes said rotating chilled casting roll.

2. An cooling device according to claim 1 wherein said air discharged from said second plenum is directed towards the web at an angle of approximately 30 degrees from the tangent to the cooling roll at the point at which said air discharged from said second plenum strikes said cooling roll.

3. An cooling device according to claim 1 wherein said first plenum is supplied with air pressurized to a pressure of at least 0.5 inches of water and said second plenum is supplied with air pressurized to a pressure of at least 0.5 inches of water.

4. An cooling device according to claim 3 wherein said air discharged from said first plenum is cooled to a temperature below ambient temperature.

* * * * *